Patented Oct. 10, 1933

1,929,912

UNITED STATES PATENT OFFICE 1,929,912

DYES OF THE PYRANTHRONE SERIES

Ronald Sidney Barnes, John Edmund Guy Harris, Birkett Wylam, and John Thomas, Grangemouth, Scotland, assignors to Scottish Dyes, Limited, Grangemouth, Scotland No Drawing. Application July 15, 1929, Serial No. 378,562, and in Great Britain August 11, 1928

4 Claims. (Cl. 260—98)

This invention relates to the production of dyes and intermediates, more particularly dyestuff derivatives and intermediates and to the art of dyeing, including printing, especially to methods where dyestuff derivatives are produced by the action of pyridine sulphur trioxide on a vat dyestuff in the presence of a metal and of a tertiary organic base, for example, pyridine.

Examples of such vat dyestuffs are indigoid vat dyestuffs including indigo and dichlor-dibrom-indigo; anthraquinone vat dyestuffs includ benzanthrone, indanthrone, flavantrone, pyranthrone and anthraquinone acridone dyestuffs of which examples are Caledon jade green (dimethoxy-dibenzanthrone), Caledon brilliant purple RR (dichloro-iso-dibenzanthrone), Caledon Red BN (anthraquinone-1: 2-naphthacridone), Caledon green B (nitrodibenzanthrone), Caledon gold orange G (pyranthrone), Caledon blue R (N-dihpdro-1: 2.1': 2'-anthraquinone-azine), Caledon yellow G (flavantrone) 5: 5'-dibrom-6: 6'-diethoxy-thioindigo halogenated indigos for example 5: 7.5': 7'-tetrabrom-indigo brilliant indigo BASF 2B (4: 4'-dichlor-7: 7'-dibrom indigo) and Caledon blue GCD (dichlorindanthrone).

In such processes a usual step is the removal of the pyridine or like tertiary base by adding the melt, to aqueous alkali and distilling.

We have found that in this process of removal there is a liability for decomposition of the dyestuff ester derivative.

The object of the present invention is to provide a process to overcome this difficulty.

We have found as a result of researches that we can prevent or reduce the decomposition of the dyestuff ester derivative by carrying out the process for the removal of the pyridine or the like in the absence of the metal or metallic substances.

The invention consists in a process for separating ester derivatives of vat dyestuffs, particularly sulphuric acid ester derivatives from melts containing them, admixed or combined with metallic copper and pyridine or the like with or without other bodies, for example diluents which comprises first removing the metal which may be free, admixed or combined, preferably as completely as possible, for example, by heating the mixture for a suitable time, preferably a minimum time, with an alkaline substance which will precipitate copper from solution, which alkaline substance may be in aqueous solution and then isolating the dyestuff for example, by separating the dyestuff from the pyridine or the like by any suitable method, for instance, removing the pyridine or the like by steam distillation.

The invention also consists in processes substantially as hereinafter described and in products which may be made by those processes or by the equivalents thereof.

The following examples illustrate how the invention may be carried into effect, reference to parts being to parts by weight and to temperatures being to degrees centigrade.

Example 1

20 parts of brominated pyranthrone containing about 30 per cent. of bromine, 60 parts of pyridine sulphuric anhydride and 100 parts of pyridine are heated together to 90°, at which temperature 16 parts of copper powder are slowly added with stirring. After the temperature has been maintained for one hour at 90° the resulting melt is mixed with 950 parts of water containing 30 parts of caustic soda. The mixture is raised to the boil by means of steam as quickly as possible and is then filtered. The sulphuric acid ester of the vat dyestuff passes through in the filtrate which is substantially free from copper or copper salts, whilst the metallic copper and copper residues are retained by the filter. The filtrates are then treated by steam distillation for recovery of the tertiary base in the usual way.

The product is the sulphuric ester of brominated pyranthrone the exact structure of which is doubtful, but it appears to contain in addition to the pyranthrone nucleus 2NA.SO₃CO groups and three bromine atoms per molecule.

Example 2

50 parts of pyridine and 30 parts of pyridine sulphuric anhydride are heated to 90° at which temperature 10 parts of brominated pyranthrone, about 30 per cent. bromine content, are added. 8 parts of copper bronze are then added in small lots during 10–15 minutes. The temperature is maintained at 90° for 2 hours, after which the melt is cooled to 55°. 90 parts of a 20 per cent. caustic soda solution are then added and the mixture heated to 85° for 5 minutes. It is then diluted with 300 parts of water at 60–70° and filtered. The extract, which contains the sulphuric acid ester substantially free from copper, is then distilled at a temperature of about 40–45° under a pressure of 1–1½ inches of mercury for removal of the pyridine.

The product appears similar to that of Example 1.

General

Derivatives obtained as described above may be used for purposes of dyeing or printing as for example, may be effected by hydrolysis and development on the fibre by means of acidic ferric chloride solution or the like.

What we claim is:—

1. The sulphuric ester of brominated pyranthrone.

2. A process for the production of a sulphuric ester of brominated pyranthrone which consists in heating together brominated pyranthrone, pyridine sulphuric anhydride and pyridine, gradually adding finely divided copper, maintaining the temperature for not less than about one hour, mixing the melt with caustic soda solution, heating the mixture, separating the metallic residue and then removing the pyridine from the liquor.

3. A process for isolating sulphuric ester derivatives of brominated pyranthrones from melts containing them together with metallic copper and tertiary bases which comprises adding to the melt an alkaline substance which will precipitate copper from solution, heating the mixture, removing the metallic substance and then removing the tertiary base.

4. A process for isolating a disulphuric ester of brominated pyranthrone from a melt containing the same together with metallic copper and a tertiary base which comprises adding to the melt an alkaline substance which will precipitate copper from solution, heating the mixture, removing the metallic substance and then removing the tertiary base from the sulphuric acid ester.

RONALD SIDNEY BARNES.
JOHN EDMUND GUY HARRIS.
BIRKETT WYLAM.
JOHN THOMAS.